No. 662,354. Patented Nov. 20, 1900.
T. COLDWELL.
LEVER LOCKING MECHANISM.
(Application filed Dec. 13, 1899. Renewed Oct. 25, 1900.)
(No Model.) 2 Sheets—Sheet 1.
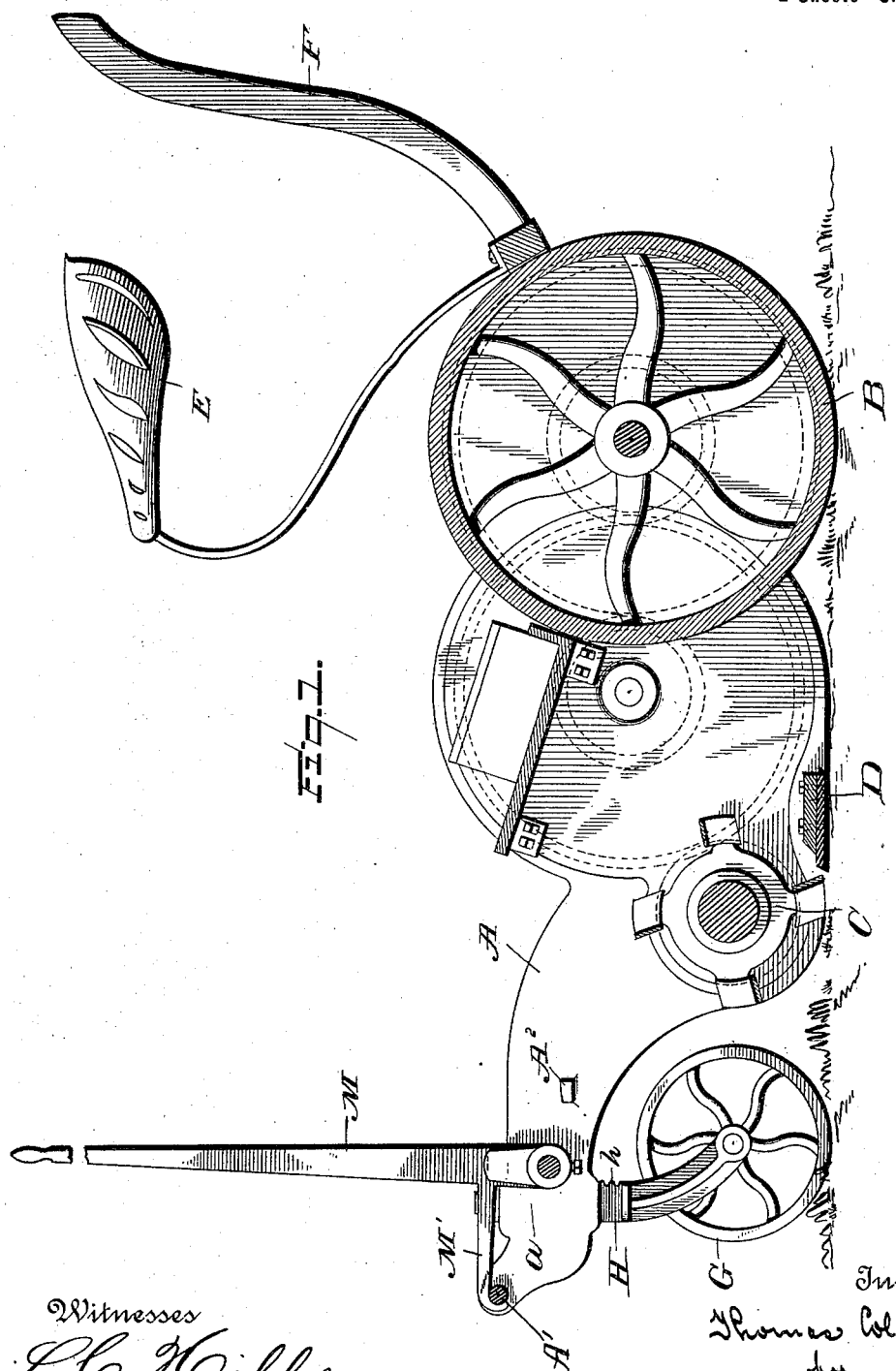
Witnesses
L. C. Hills.
J. D. Kingsbury.
Inventor
Thomas Coldwell
by
Whitaker Prevost.
Attorneys No. 662,354. Patented Nov. 20, 1900.
T. COLDWELL.
LEVER LOCKING MECHANISM.
(Application filed Dec. 13, 1899. Renewed Oct. 25, 1900.)
(No Model.) 2 Sheets—Sheet 2.
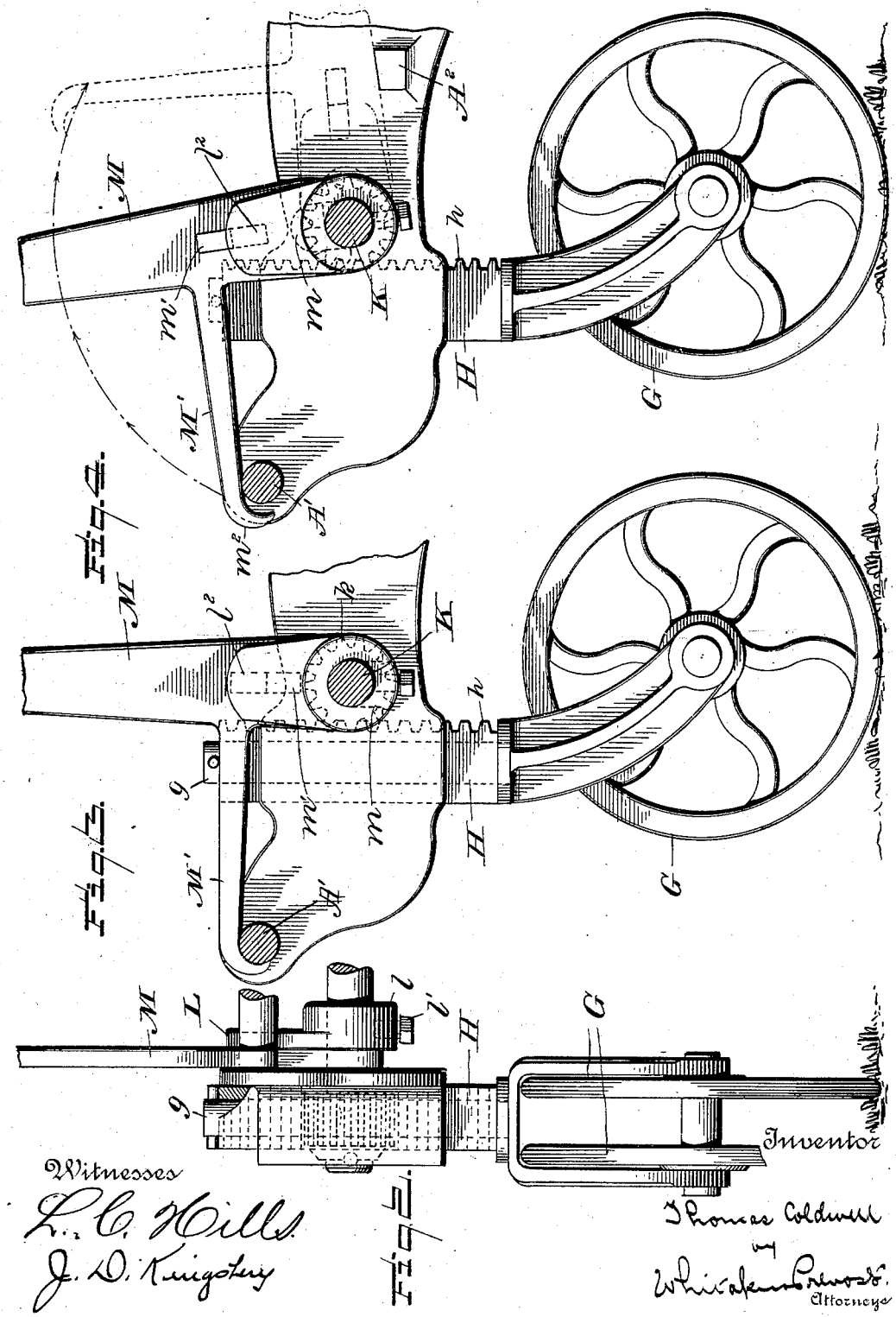

United States Patent Office.

THOMAS COLDWELL, OF NEWBURG, NEW YORK.

LEVER-LOCKING MECHANISM.

SPECIFICATION forming part of Letters Patent No. 662,354, dated November 20, 1900.

Application filed December 13, 1899. Renewed October 25, 1900. Serial No. 34,329. (No model.)

*To all whom it may concern:*

Be it known that I, THOMAS COLDWELL, a citizen of the United States, residing at Newburg, in the county of Orange and State of New York, have invented certain new and useful Improvements in Lever-Locking Mechanism; and I do hereby declare the following to be a full, clear, and exact description of the invention, such as will enable others skilled in the art to which it appertains to make and use the same.

My invention is an improvement in lever-locking mechanism for lawn-mowers and other devices; and it consists in the novel features of construction and combination of parts hereinafter fully described, reference being had to the accompanying drawings, which illustrate one form in which I have contemplated embodying my invention, and said invention is fully disclosed in the following description and claims.

Referring to the accompanying drawings, Figure 1 represents a longitudinal vertical sectional view of a horse lawn-mower with my invention applied thereto. Fig. 2 is a front elevation of a portion of the machine, showing my invention and drawn to a larger scale. Fig. 3 is a side view of the parts shown in Fig. 2 on the scale of Fig. 2. Fig. 4 is a view similar to Fig. 3, but showing the parts in different positions.

In the present instance I have shown my invention applied to a horse lawn-mower for adjusting the height of cut of the mower.

A represents one of the side frames of the mower; B, the driving wheel or roller; C, the rotary cutter; D, the stationary cutting-blade; E, the driver's seat, and F the steering-handles. The front ends of the side frames are supported by caster-wheels, (one of which is shown at G,) which can be moved up and down in the frame to regulate the height of the cutters from the ground for adjusting the height of cut and to raise the cutters out of operative position in moving the machine from place to place. Each side frame is provided with a vertical guide $a$, in which is located a vertically-sliding block H, to which the shank $g$ of one of the caster-wheels is pivotally connected. Each block H is provided on its rear face with a rack $h$, the teeth of which are engaged by a pinion $k$ on a shaft K, extending entirely across the machine from one side frame to the other, so that by rotating this shaft K both pinions are rotated and both caster-wheels are raised or lowered in respect to the frame, thus lowering or raising the frame and cutters with respect to the ground. At one side of the machine, preferably the right side, the shaft K is provided with a short operating-arm L, adjustably secured thereto—in this instance by providing said arm with a collar $l$, to engage the shaft to which it is adjustably secured by means of a set-screw $l'$.

M represents the hand-lever, which is provided at its lower end with a slotted portion $m$ to engage the shaft K, so that the lever can be moved bodily up and down on the shaft. The hand-lever M is connected to the arm L, so as not to interfere with the longitudinal movement of said lever. In this instance I have shown the arm L provided with a laterally-extending lug or projection $l^2$, which engages a slot $m'$ in the hand-lever M; but it is perfectly obvious that the lever might be provided with a projection and the arm L with a slot, if desired. The lever M is also provided with a forwardly-extending retaining-arm M', formed integrally therewith or secured rigidly thereto and provided at its end with a curved portion or hook $m^2$, which is adapted to engage a cross-bar A', connecting the forward ends of the side frame or other rigid part of the frame. The relation of the parts is such that when the lever M is in its forward position the hook $m^2$ will engage the rod A' and hold the lever M, the arm L, and shaft K and connected parts firmly in position. When it is desired to change the position of the caster-wheels to change the elevation of the cutters, the lever M will be pushed forward toward the bar A'. This causes the lever M to be raised bodily with respect to the shaft K and arm L, as shown in Fig. 4, the slots $m$ and $m'$ permitting this movement. This increases slightly the distance between the end of hook $m^2$ and the center of shaft K, and if the lever M be swung backward the point of the hook $m^2$ will clear the bar A', as shown in dotted lines in Fig. 4, permitting the lever M to be moved rearward until arrested by a suitable stop, such as is shown at A² on the side frame A. To throw the lever M forward and lock it, said lever is moved forward until the hook $m^2$ reaches the bar A', when the lever M is raised slightly longitudinally to allow the hook $m^2$ to pass over said bar, and is then allowed to resume its normal position, thus locking the hook over the bar A'. By this means the lever M can be quickly thrown to the rear to lower the cutters toward the ground or thrown forward and locked to hold the cutters raised out of operative position. If it is desired to regulate the height the cutters are desired to be from the ground when in cutting position, the set-screw $l'$ can be loosened and the arm L adjusted with respect to the shaft K to produce this result.

While I have shown this lever-locking device applied to a lawn-mower and advantageously employ it in connection with the devices such as are shown for adjusting the machine vertically, the lever-locking device herein shown and described may be used in other connections wherever found convenient without departing from my invention, and I claim this lever-locking device broadly, whether used in a lawn-mower or other device.

In the specification and claims I have referred to the "longitudinal movement" of the lever M, by which is meant a movement of said lever longitudinally of itself, such movement being of necessity transverse to the axis of the shaft K.

What I claim, and desire to secure by Letters Patent, is—

1. The combination with a lever, a pivotal support therefor engaging a slotted portion of the lever, a rigid retaining-arm secured to said lever and provided at its outer end with a retaining projection, of a stationary part adapted to be engaged by said retaining projection, whereby said lever may be moved longitudinally with respect to its pivotal support to cause said retaining-arm to engage or disengage said stationary part, substantially as described.

2. The combination with a shaft, of an operating-arm secured thereto, a lever pivotally mounted on said shaft, but capable of moving longitudinally, an operative connection between said lever and said arm permitting the longitudinal movement of said lever, a retaining-arm secured to said lever having a retaining projection or hook and a stationary part adapted to be engaged by said retaining projection or hook, whereby said lever can be moved longitudinally with respect to said shaft and arm to cause said retaining-arm to engage or disengage said stationary part, substantially as described.

3. The combination with a shaft, of an arm secured thereto, of a lever having a longitudinally-extending slotted portion pivotally engaging said shaft, said lever and said arm having the one a projection engaging a slot in the other to permit said lever to move longitudinally, a retaining-arm rigidly secured to said lever and provided with a retaining projection at its outer end, and a stationary part adapted to be engaged by said retaining projection, substantially as described.

4. The combination with a shaft, of an arm adjustably secured thereto, a lever having a longitudinally-slotted portion engaging said shaft, said lever and arm having the one a projection engaging a slot in the other to permit the lever to move longitudinally, a retaining-arm secured rigidly to said lever and provided with a retaining projection, and a stationary part adapted to be engaged by said retaining projection, substantially as described.

In testimony whereof I affix my signature in the presence of two witnesses.

THOMAS COLDWELL.

Witnesses:
  G. B. BUTLER,
  W. P. WHEELER.